June 4, 1946.  S. G. VON STOCKER  2,401,592
WORK HANDLING APPARATUS
Filed Dec. 28, 1943   2 Sheets-Sheet 1
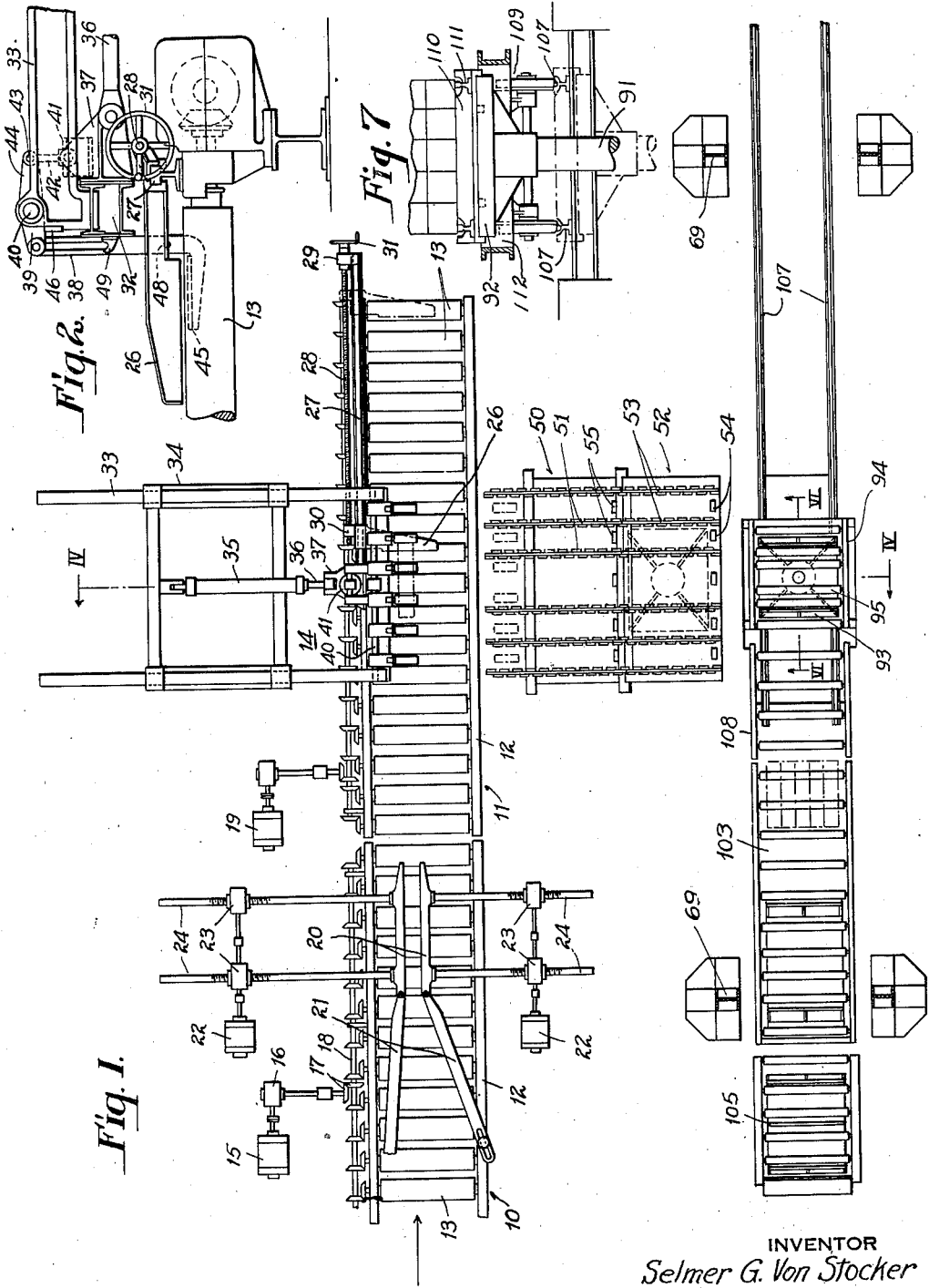
INVENTOR
Selmer G. Von Stocker
BY
Howard B. Funk
ATTORNEY June 4, 1946.　　S. G. VON STOCKER　　2,401,592
WORK HANDLING APPARATUS
Filed Dec. 28, 1943　　2 Sheets-Sheet 2
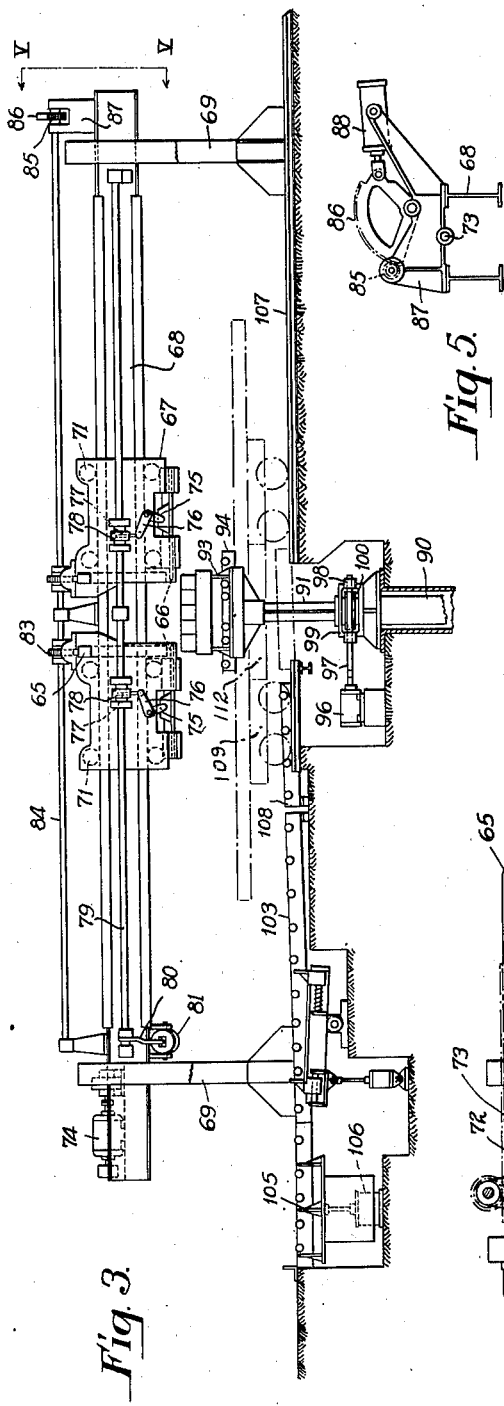
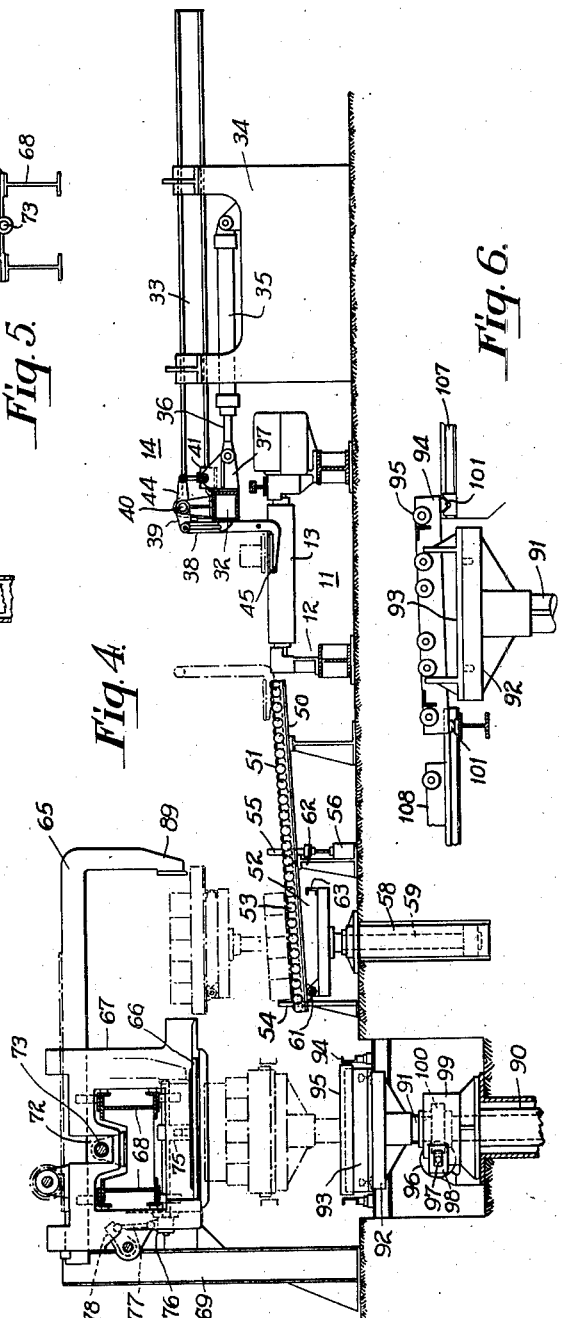
INVENTOR
Selmer G. Von Stocker
BY
Howard B. Funk
ATTORNEY Patented June 4, 1946

2,401,592

UNITED STATES PATENT OFFICE 2,401,592

WORK HANDLING APPARATUS

Selmer G. Von Stocker, Massena, N. Y., assignor to Aluminum Company of America, Pittsburgh, Pa., a corporation of Pennsylvania Application December 28, 1943, Serial No. 515,895

12 Claims. (Cl. 214—6)

This invention relates to apparatus for handling work pieces such as blooms, billets, bars, slabs and the like, and more particularly to apparatus for piling the same and discharging the piles.

An object of the invention is to provide apparatus for taking billets, for example, as they are discharged from a working operation, such as rolling, shearing, scalping, etc., and assembling them into piled relation rapidly and without marring or scoring the faces thereof. Another object of the invention is to provide a piler mechanism capable of efficiently handling an extensive range of sizes, weights and lengths of work and in which either cross piling or parallel piling may be effected. A further object of the invention is to provide an improved piling apparatus wherein discharge of the piles is effected without interruption or slow down of the rate of delivery of the work to the piler from a working mechanism with which the piler is associated. A still further object of the invention is to provide an apparatus of the type referred to in which cooperating elevator devices arranged in side by side relation are employed to expedite handling and piling of large heavy work pieces, and whereby piling is carried out above floor level at such an elevation that discharge of the pile is accomplished without first lifting the pile. These and other objects and advantages of the invention to be realized from the combinations, arrangements and a construction herein involved will become more apparent from the detailed description which follows, taken in conjunction with the accompanying drawings wherein:

Fig. 1 is a somewhat diagrammatic plan view of an arrangement of an apparatus embodying the features of the invention;

Fig. 2 is a fragmentary end view, on an enlarged scale, of a portion of the apparatus of Fig. 1, and specifically showing the work stop and transfer mechanism;

Fig. 3 is a side view, partly in section and partly in elevation, showing the piler and discharge mechanism;

Fig. 4 is a cross sectional view, on a slightly enlarged scale, taken on the line IV—IV of Fig. 1;

Fig. 5 is a detail view looking in the direction of the arrows V—V of Fig. 3;

Fig. 6 is a detailed sectional view, on an enlarged scale, taken on the line VI—VI of Fig. 1; and Fig. 7 is a cross sectional detail view of the car form of pile discharging apparatus shown in Fig. 3.

Referring to Fig. 1 of the drawings, the billets to be piled are moved in the direction of their length away from a shear (not shown) along runout table sections or conveyors 10 and 11 which, together with the shear, may comprise a portion of a blooming mill installation. The aligned table sections 10 and 11, which constitute a runway, may comprise a plurality of suitable frames 12 provided with bearings in which are journalled rollers 13 for supporting the billets and moving them to a transfer mechanism indicated generally by the numeral 14. The rollers 13 of the section 10 may be driven by a motor 15 through reduction gearing 16, bevel gears 17 and a shaft 18 carrying bevel gears in mesh with bevel gears on the ends of the roller shafts. Likewise, the rollers 13 of the table section 11 may be driven by a motor 19 through similar gearing mechanism. The rollers 13 of the table section 11 may, if desired, be driven at a different peripheral speed than the rollers of table section 10.

As successive billets are advanced along the table section 10, they are directed or deflected for movement between parallel guides 20 by the angularly disposed bars 21. The guides 20 and the bars 21 are disposed above the rollers 13 and each guide and its lead in bar may be adjusted with respect to the other by operation of a suitable adjusting mechanism which may comprise a motor 22, and gear mechanisms 23 having rotatable members in screw threaded engagement with threaded adjusting rods 24. The guides are not only adjustable with respect to each other to accommodate billets of various widths but are also adjustable to various positions transversely of the conveyor. The bars 21 are pivoted at one end to the respective guides and at their other end to the frame members 12 so as to be moved in unison with the guides 20 when adjustments are made.

When each of the billets reaches the transfer station 14, its longitudinal movement is arrested, preferably by use of a stop bar 26. The stop bar 26, as best seen in Figs. 1 and 2, may suitably be slidably mounted upon a rail 27 supported at one side of the conveyor section 12 as by securing it to suitable brackets, or to the housings which contain the bearings for the rollers 13, as illustrated. An elongated screw threaded rod 28 paralleling the rail 27 is journalled at one end in a bearing 29 secured to the outermost end of the rail 27 and it has threaded engagement with an ear or lug 30 projecting from the stop bar 26. A handwheel 31 or other suitable means may be secured to the threaded rod 28 for rotating the same, whereby the stop 26 may be shifted along the rail 27 to various positions of adjustment with respect to the center line of the transfer mechanism 14. The stop bar 26 will initially be adjusted to such position that a billet engaged thereagainst will be centered lengthwise with respect to the center line of the transfer mechanism.

The transfer mechanism 14, as best seen in Figs. 1, 2 and 4, may comprise a horizontal beam 32 parallel with the line of travel of the billets on the table section 11 and secured to the forward ends of supporting bars 33 that are slidably supported and guided for reciprocatory movements in a supporting framework 34. A hydraulic cylinder 35 is secured to the framework 34 and its piston rod 36 is connected to the bracket 37 secured to the beam 32. By admitting fluid pressure alternately to the opposite ends of the cylinder 35 by suitable valve control means, the beam 32 is moved transversely of the table section 11.

Disposed at the forward face of the beam 32 are a plurality of hanger bars 38 that are pivotally connected at their upper ends to rocker arms 39 rigidly secured to a rock shaft 40 that is suitably journalled in bearings carried by the beam 32 and the bars 33. An air cylinder 41 is supported on trunnions in the bracket 37, and its piston rod 42 has pivotal connection at 43 with arms 44 rigidly associated with the rock shaft 40 whereby vertical movements may be imparted to the hanger bars 38.

The hanger bars are of substantial L-shape and extend down in the spaces between adjacent rollers 13, and the horizontal portions 45 thereof constitute lifting members for engaging the underside of a billet to lift the billet off the rollers 13 when the hanger bars 38 are moved upwardly. Downward movement of the hanger bars is limited by a stop 46 secured to the bars 33 in position to engage the undersides of the rocker arms 39. The lifting members 45 are normally disposed below the top plane of the rollers 13.

The center of the piling mechanism hereinafter described and the center of the transfer mechanism are disposed in alignment in right angle relation to the path of travel of the billets along the roller tables. To effect proper piling, of course, it is necessary to stop the billets on the table 11 in centered position with respect to the center line of the transfer mechanism and the piler. Accordingly, for the shortest billets to be piled, the stop bar 26 will have to be moved to a position under the beam 32 to the position shown in full lines in Fig. 1. To avoid interference between the two endmost lifting members 45 and the stop bar 26, they are adapted to be held in an inoperative position above the stop bar. Suitable means for this purpose may comprise pins 48 carried by each of the two outermost hanger bars 38 and hook members 49 secured to the front face of the beam 32. These two bars are vertically slotted, as best seen in Fig. 2, whereby either of them may be raised and its pin 48 engaged in a hook member 49; thereby, the hanger bar is supported in an inoperative position. When the stop bar 26 is adjusted to any position outwardly from the transfer mechanism, all of the lifting members 45 of the transfer mechanism will be operative to support and elevate the billets, and a sufficient number of them are provided to support the longest billet to be handled with stability.

The heretofore mentioned guides 20 are so adjusted that the billets as they advance along the roller table 10 are shifted sidewise to a lateral position in longitudinal alignment with the lifting members 45 of the transfer mechanism 14 so that when the billets engage the stop bar 26 they will be located directly above the lifters 45. The lifters 45 are actuated to raise a billet from the rollers 13 by admitting fluid pressure to cylinder 41, and then pressure is admitted to hydraulic cylinder 35 to move the raised billet sidewise to a skid table 50. The transferred billet is set down onto the skid table 50 by lowering of the lifting members 45, and then the transfer mechanism is retracted to its full line position in readiness to receive the succeeding billet.

The skid table 50 preferably is provided with a series of roller skid rails 51, which rails are inclined downwardly at a sufficient gradient to permit gravity movement of billets therealong. The billets discharge from the skid table 50 onto a carrier or loading platform 52 which preferably is provided with a billet supporting surface in the form of a series of roller skid rails 53 to facilitate movement of the billet thereover. A stop member 54, which may be in the form of vertically disposed bars, is provided to prevent movement of the billets from the side of the carrier opposite the skid table 50. A predetermined number of billets are collected on the loading platform in side by side relation and each collected group of billets thus formed is subsequently handled as a unit. Thereby, not only is wear and tear on the equipment materially reduced but handling operations to effect piling is rendered much more rapid than otherwise would be the case.

Adjacent the lower or discharge end of the skid table 50, vertically movable stop members 55 are provided to restrain succeeding billets against discharge from the table 50 when the loading platform is not in its receiving position. The stop members 55 are adapted to be moved into and out of stopping position by an operating cylinder 56. With the stops 55 in raised position, which will be the case when the loading platform is not disposed in alignment with the table 50, succeeding billets coming from the shear without interruption will be picked up one at a time and transferred to the skid table and stored thereon.

Suitable means to impart vertical movements to the loading platform 52 may take the form of a vertical hydraulic cylinder 58 having a vertically movable plunger 59 to the upper end of which the platform is secured, and this mechanism in its entirety constitutes a lifting elevator. The skid rails 52 are preferably pivotally mounted as indicated at 61 so that they may assume an inclined position corresponding to the inclination of the skid rails 51. To accomplish this automatically, the ends of the skid rails 53 adjacent to the rails 51 are adapted to engage bracket member 62 during downward movement of the carrier into its lowermost position. By admitting fluid pressure to the underside of plunger 59 in cylinder 58, the carrier 52 will be raised until it reaches a predetermined elevated position, as shown in dotted lines in Fig. 4. During initial stage of this raising movement, it is to be observed that the skid rails 52 will first be moved to a level or horizontal position and their free end supportingly engaged by a bar 63 before they are raised off the bracket 62, whereby there will be no tendency of the billets supported thereon to roll sidewise.

The group of billets thus elevated may be removed laterally from the lifting elevator by horizontally reciprocable unloader or pusher bars 65 onto spaced apart retractable members in the form of shelves or ledges 66 on which the billets are supported at their ends. Directly beneath the shelves 66 and midway between them is provided a vertically movable piler elevator having means to receive the billets when they are released by retraction of the supports 66.

As best seen in Figs. 3 and 4, bars 65 and members 66 are mounted in carriages 67 supported on a superstructure or elevated framework comprising a pair of beams 68 supported adjacent their ends on uprights or columns 69. The carriages 67 are mounted on the parallel beams 68 for adjustment therealong into preadjusted positions and they suitably may be provided with wheels 71 engaging track portions on the beams to support the carriages and facilitate adjustment thereof. Each of the carriages may be provided with a nut member 72 (Fig. 4) in threaded engagement with a screw rod 73 that is extended in parallelism with the beams 68 and is suitably journalled at its ends and at its mid point in suitable bearing brackets carried by the framework. The screw 73 is provided with right and left hand threads whereby upon turning thereof by motor 74 geared to one end of the screw rod, the carriages 67 are simultaneously moved along the beams 68 and through equal distances from a mid point therebetween to preadjusted positions accommodating billets of various lengths for movement onto the shelf members 66. The shelf members 66 are slidably mounted on the underside of the carriages respectively, as best seen in Fig. 3, and each of them are adapted to be retracted and advanced simultaneously. The mechanism for actuating the shelves may comprise rocker arms 75 and 76, the former being connected to the shelf members and the latter having ball and socket connection with a link 77 which has similar connection with an arm 78 that is non-rotatably but slidably mounted on a horizontal shaft 79 suitably journalled in bearings carried by one of the beams 68. An arm 80 is secured to the shaft 79 and is connected to a piston rod of an air cylinder 81, whereby the shaft 79 may be actuated to retract or advance the respective shelves 66.

The unloading bars 65 are slidably supported in the upper sides of the carriages 67 in overlying relation to the shelves 66. Each arm 65 may suitably be provided with a rack bar engaging a gear 83 that is non-rotatably and slidably secured to a shaft 84 supported in suitable bearing brackets carried by the beams 68. As best seen in Figs. 3 and 5, the shaft 84 is provided at one end with a pinion 85 in mesh with a gear segment 86 journalled in a bracket 87, which gear segment is adapted to be actuated by an operating cylinder 88. By actuating the gear segment 86 in one direction, the unloading bars 65 are pulled in toward the carriages 67 so that their depending leg portions 89 engage the outermost billet of the group on the loading platform in its elevated position and move the groups of billets onto the retractable members 66. As soon as the billets have been removed from the carrier 52, the carrier may be returned to its lower billet receiving position in alignment with the skid table 50, and the stops 55 withdrawn to allow the billets collected on the table 50 to move onto the carrier 52.

The piler elevator which receives the billets from the supports 66 may suitably comprise a hydraulic cylinder 90 having a plunger 91 carrying a substantially rectangular supporting plate 92 at its upper end. Adapted to be positioned on plate 92 is a high skid member 93 having spaced apart vertical ledges. A roller platform 94 having rollers 95 extending transversely thereof and suitably journalled therein with the tops of the rollers disposed above the upper edge of the platform is adapted to be supported in embracing relation on the skid 93. The skid 93 is adapted to be moved upwardly into a billet receiving position, the roller platform being merely carried along with the skid 93 below the upper edges of the ledges thereof, in which position the skid is adapted to receive the first layer of billets from the shelves 66. The skid will be disposed in a plane just slightly below the level of the shelves.

With a group of billets supported at its ends on the shelves 66, upon retraction of shelves the billets will drop down onto the skid 93. Then the skid with the layer of billets thereon will be lowered a distance substantially equal to the height of the billets by valving off a suitable amount of liquid from the cylinder 90 to dispose the row of billets just below the shelves in position to receive a succeeding group of billets thereon.

In case it is desired to cross pile succeeding layers of billets, suitable means are provided to index the support 93 through 90°. This means may suitably comprise a hydraulic cylinder 96 having a piston whose rod is connected with a rack bar 97 that is slidably supported in bosses 98 formed on a housing 99 that is secured to the upper end of the hydraulic cylinder 90. Contained within the housing 99 is a gear 100 with which the rack bar 97 meshes, the gear 100 having splined connection with the plunger 91. It will be seen that by moving the rack bar 97 in one direction the plunger 91 will be rotated, the extent of movement of the rack bar being such that 90° of rotation will be imparted to the plunger, while movement in the opposite direction will rotate the plunger back to its original position. In this fashion the skid and the load of billets supported thereon may be turned to receive a succeeding layer of billets thereon in right angle relation to the initially deposited layer of billets.

After a desired number of layers of billets have been piled on top of each other on the piler elevator, the pile is lowered to effect discharge thereof. During such lowering movement, the roller platform, which may be provided with knobs or buttons 101 on its lower side, will engage suitable supporting members to cause the platform to assume an inclined position in alignment with a longitudinally disposed runway or discharge conveyor 102. Lowering movement of the pile, however, is continued so that it and the skid platform move downwardly relative to the roller platform until the skid disappears below the level of the rollers on the roller platform, thereby transferring the weight of the load from the skid 93 to the rollers 95. Automatically then, the pile of billets will gravitate along the roller platform 94 and the runway 102.

From the foregoing it is believed that the operation of the apparatus will be quite clear but briefly the operation is as follows.

Individual billets, successively moving along the roller table section 10, are guided into predetermined lateral position by the guides 20 and are advanced by the rollers 13 until they engage the preadjusted stop member 26. The lifting members 45 are then actuated by air cylinder 41 to lift the billet from the rollers 13 and it is carried sidewise into position over the skid table 51 by operation of the hydraulic cylinder 35. Thereupon the billet is lowered onto the skid table where it gravitates to the loading platform 52 of the first or lifting elevator. The transfer mechanism may be actuated in timed relation with the shearing mechanism, and after a desired number of billets thus individually handled have been collected upon the loading platform 52, stop 55 is raised and following billets are collected upon the skid table 50. In the meantime, the first elevator is actuated to raise the load of billets to the level of the retracting shelves 66, whereupon unloading bars 65 are actuated to move the group of billets sidewise onto the shelves. The second or piler elevator, with its skid and roller platform, having been raised into upper billet receiving position slightly below the shelves, the shelves are retracted to permit the billets to drop onto the piler skid. In the meantime, the first elevator is returned to billet receiving position and the stop 55 retracted to permit the billets collected or stored on the skid table to move onto the loading platform for a repetition of the piling cycle as soon as the platform is again filled with a group of billets. Rotation of the skid 93 and the billets thereon through 90° may be effected as soon as the piler elevator has been lowered into position to receive the succeeding layer of billets in case cross piling is to be effected.

After the pile has ben formed, complete lowering thereof is effected and the weight of the pile transferred from the skid onto the roller platform and automatic discharge of the pile takes place, as heretofore described. At the end of runway 103 the pile of billets may be stopped above a lifting skid 105 which may be moved upwardly by a cylinder 106 to raise the pile so that it can conveniently be picked up and transported by a fork truck or other suitable transporting device.

In connection with long billets it may be desired to deposit them after piling onto a traveling car 109 so that the pile of billets may be picked up directly by a building crane or other suitable mechanism. Tracks 107 paralleling the runway 103 are provided for movement of the car under the superstructure, the car being positioned with its mid portion overlying the piler elevator, as shown in broken lines in Fig. 3. In order to permit movement of the car to this position, a section 108 of the runway 103 is removed to expose the track rails therebelow. Also, the high skid 93 and associated roller platform 94 will be removed from the piler elevator and replaced with a shallow skid 110 (Fig. 7) having rails 111 for alignment with the track rails 107 to accommodate movement of the car wheels thereacross when the skid is at track level, as shown in broken lines in Fig. 7. In addition, the body of the car is provided with a central opening 112 to enable the skid on the elevator to be moved upwardly through it into position to receive the billets thereon. After adjustment of the mechanism to accommodate for the length of billets being handled, the operation will be the same as that heretofore described except that the turning of the piler mechanism will be eliminated so that parallel piling of the piles will be effected. Successive layers of billets are deposited upon the skid 110 and then the skid is lowered down through the opening in the car to track level, during which descent the pile of billets is deposited on the car. Then the car with its load of billets thereon may be pulled along the track 107 from under the elevated structure and the billets removed from the car.

By picking up the work and carrying it sidewise from the delivery table section 11, excessive wear upon the rollers thereof and danger of scratching and marring the surfaces of the work piece are eliminated. It also will be apparent that the provision of the cooperating elevator devices, one for initially receiving a group of work pieces and the other for receiving and piling of the same thereon, is an important feature of the invention since it enables piling of the work and discharge of the piles to be effected always by a downward movement of the work in piled relation, which pile, of course, becomes progressively bulky and weighty as it builds up, thereby consuming less power and enabling faster operation. It also will take care of differences in elevation between the level of discharge from various working machines with respect to floor level and the piling above floor level for downward movement of the pile as aforesaid.

While a particular embodiment of the invention has been herein illustrated and described, certain features may be used independently of others, and it will be understood that various modifications and changes may be made, and equivalent elements substituted, all without departing from the spirit of the invention or the scope of the appended claims.

I claim:

1. In apparatus for handling billets and the like, in combination, means for transferring successive billets in a sidewise direction, supporting means on which a group of transferred billets are collected, means to move said supporting means vertically to an unloading position, means for removing said group of billets from said supporting means at said unloading position, retractable devices arranged to receive the removed billets and support them adjacent their ends and means to actuate said retractable devices for effecting discharge of the billets therefrom.

2. The combination as defined in claim 1 wherein said transfer means includes a stop means movable into position to interrupt sidewise movement of the billets in advance of said supporting means and means for actuating said stop means into and out of stopping position, said stop means being withdrawn subsequent to returning of said supporting means from said unloading position into billet collecting position.

3. Apparatus for piling billets and the like comprising, in combination, a transfer device for moving successive billets sidewise, a stop member associated with said device, supporting means for receiving the transferred billets in groups in side by side relation, means for moving said supporting means vertically from receiving position to an elevated unloading position, means by which the group of billets on said supporting means is unloaded therefrom at said unloading position, retractable devices positioned to receive said group of unloaded billets and arranged to support them adjacent their ends, means to actuate said retractable devices, a receiver below said retractable devices a distance less than the height of the billets to receive the billets released from said retractable devices, and means to lower said receiver into successive positions for receiving succeeding groups of billets in piled relation, and into a discharge position for discharge of the pile.

4. Apparatus for piling billets and the like comprising, in combination, a transfer device for moving successive billets sidewise, a stop member associated with said device, supporting means for receiving the transferred billets in groups in side by side relation, means for moving said supporting means vertically from receiving position to an elevated unloading position, means by which the group of billets on said supporting means is unloaded therefrom at said unloading position, retractable devices positioned to receive said group of unloaded billets and arranged to support them adjacent their ends, means to actuate said retractable devices, a receiver below said retractable devices a distance less than the height of the billets to receive the billets released from said retractable devices, means to lower said receiver into successive positions for receiving succeeding groups of billets in piled relation, and into a discharge position for discharge of the pile, and means operable to rotate said receiver about a vertical axis through a predetermined angular distance whereby each succeeding layer of billets deposited thereon is angularly disposed relative to the preceding layer.

5. An apparatus as defined in claim 3 wherein said transfer device includes lifting members for lifting the billets preliminary to transfer thereof, and means to actuate said lifting members.

6. Apparatus as defined in claim 3 in which said receiver comprises a skid to support the billets during piling, a roller platform embracing said skid and disposed below the upper side thereof, and cooperable therewith, a downwardly inclined runway leading away from said receiver at the discharge position thereof, and supports engageable by opposite ends of said roller platform to cause the latter to assume an inclined position in registry with said runway during downward movement of said receiver, said downward movement being continued to lower said skid below the plane of said roller platform whereby the pile is transferred to the latter for gravitational discharge movement along said platform and said runway.

7. In apparatus for handling and piling billets and the like, the combination of advancing means for imparting lengthwise movement to successive billets, transfer mechanism including lifting members for bodily raising each billet and carrying it in a sidewise direction relative to said advancing means, an adjustable abutment engageable by each advancing billet to center the same longitudinally with respect to said transfer mechanism, conveyor means to receive the transferred billets for continued movement in a sidewise direction, a vertically movable carrier in alignment with said conveyor, means to move said carrier to an elevated position after a group of billets has been collected thereon, means operable at said elevated position for removing the group of billets from said carrier to a place of discharge, and stop means associated with said conveyor means to prevent discharge of billets from the latter while said carrier is out of registry therewith.

8. In apparatus for handling and piling billets and the like, the combination of advancing means for imparting lengthwise movement to successive billets, transfer mechanism including lifting members for bodily raising each billet and carrying it in a sidewise direction relative to said advancing means, an adjustable abutment engageable by each advancing billet to center the same longitudinally with respect to said transfer mechanism, conveyor means to receive the transferred billets for continued movement in a sidewise direction, a vertically movable carrier in alignment with said conveyor, means to move said carrier to an elevated position after a group of billets has been collected thereon, horizontally disposed shelf members located in said elevated position laterally of the path of movement of said carrier for receiving said group of billets and supporting them at their ends, an unloading member operable to move said group of billets from said carrier onto said shelf members, and means operable to actuate said shelf members to move them out of supporting engagement with said billets.

9. Apparatus for handling billets and the like comprising a skid having spaced vertical ledges, a roller platform loosely resting on said skid in embracing relation thereto and disposed below the upper side of said ledges, said platform having rollers parallel to said ledges, means supporting said skid for vertical movements, including actuating means therefor, means for forming a pile of billets on said skid in an upper position thereof, the lowermost billets of the pile spanning and resting on said ledges of the skid, a runway along which the pile may move by gravity, said skid being lowered to bring said roller platform into registry with said runway, and means engaged by said platform for tilting and supporting the same in an inclined position of registry with said runway, while said skid is further lowered to transfer said pile to said platform for automatic discharge of the pile to said runway.

10. Handling apparatus for billets and the like having, in combination, a vertically movable carrier for receiving a group of billets thereon, means for moving said carrier to an unloading position, a horizontally reciprocable member for unloading said group of billets from said carrier, retractable devices positioned to receive said group of unloaded billets and arranged to support them adjacent their ends, means to actuate said retractable devices to release said billets supported thereon, and a second vertically movable carrier below said retractable devices for receiving the released billets and for moving them to a point of discharge after a plurality of superimposed layers of billets have been piled thereon.

11. Handling apparatus for billets and the like having, in combination, a vertically movable carrier for receiving a group of billets thereon, means for moving said carrier to an unloading position, a horizontally reciprocable member for unloading said group of billets from said carrier, retractable devices positioned to receive said group of unloaded billets and arranged to support them adjacent their ends, means to actuate said retractable devices to release said billets supported thereon, a second vertically movable carrier for receiving the unloaded billets and for moving them to a point of discharge after a plurality of superimposed layers of billets have been piled thereon, and means operable to rotate said second carrier 90° to effect cross piling of the successive layers of billets.

12. Billet piling apparatus comprising a pair of adjustable carriages mounted on a common elevated horizontal support in spaced relation for lateral movement of billets therebetween, opposed retractable ledges carried by said carriages below said support for supporting the billets moved between said carriages at their ends, a billet carrier at one side of said carriages on which a group of said billets is received in aligned side by side relation, means for moving said carrier upwardly into an unloading position opposite the ends of said ledges, a reciprocable pusher member movable horizontally for pushing said group of billets sidewise from said carrier onto said ledges, actuating means for retracting said ledges to discharge said group of billets therefrom, and a vertically adjustable receiver operable below said retractable ledges for receiving successively discharged groups of billets in piled relation thereon, and for moving the formed pile downwardly to a point of discharge therefrom.

SELMER G. VON STOCKER.